Figure 2:
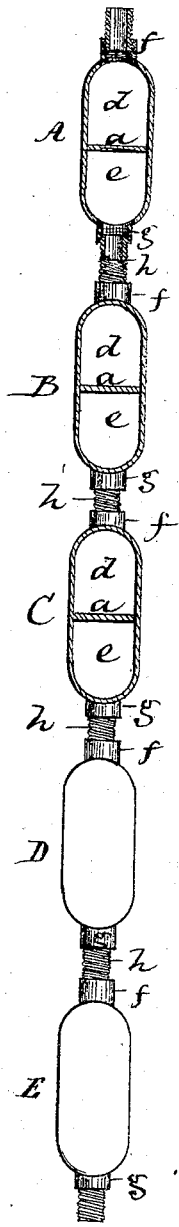

E. C. CLAY.
Improvement in Steam Heaters.
No. 120,184. Patented Oct. 24, 1871.

UNITED STATES PATENT OFFICE.

EDWARD C. CLAY, OF MALDEN, MASSACHUSETTS.

IMPROVEMENT IN STEAM-HEATERS.

Specification forming part of Letters Patent No. 120,184, dated October 24, 1871.

*To all whom it may concern:*

Be it known that I, EDWARD C. CLAY, of Malden, in the county of Middlesex and State of Massachusetts, have invented an Improvement in Radiators; and I do hereby declare that the following, taken in connection with the drawing which accompanies and forms part of this specification, is a description of my invention sufficient to enable those skilled in the art to practice it.

My invention relates to an improved method of constructing and arranging hot-water or steam-heat radiating apparatus, with reference to such disposition of the hot-water or steam-spaces or chambers and such connection of the parts as shall insure the most efficient circulation, the greatest freedom from strain upon the connections, (from expansion and contraction,) and such simplicity in the coupling devices as shall render the labor of connecting and disconnecting the sections of the apparatus very slight and easy.

In constructing the apparatus I make a series of long flat tubes, and through the center of each tube I run a diaphragm or partition, extending from one end of the tube almost, but not quite, to the opposite end thereof. On opposite edges of the tube (at the end divided by the diaphragm,) I tap two nut-threaded holes in exact axial line with each other; and the requisite number of tubes being thus made with divisions and tapped with nut-threaded opposite holes in line, I form a series of such pipes by connecting adjacent pipes by short screw-threaded joint or coupling-tubes, each tube joining two pipes. I then have a system of radiator-pipes, in which the hot water or steam entering the end of one pipe passes through the chamber in one side of the pipe to the opposite end of the pipe; thence around the end of the partition into the opposite chamber, and through said chamber to the opposite end of the pipe, where it escapes through the next coupling-tube into the next pipe, through the two chambers of which it circulates in the same manner and passes into the next pipe; and so on through the whole series.

It is in this specific construction and arrangement of the pipes and their steam-passages and connections that my invention consists; or in a radiating apparatus composed of a series of pipes, each divided by a central partition into two chambers connected at one end, and each having at the other end two axially opposite nut-threaded holes, by which holes the pipes are connected by short screw-threaded coupling-tubes extending from pipe to pipe.

The drawing represents a radiating apparatus composed of a series of these pipes.

Figure 1:
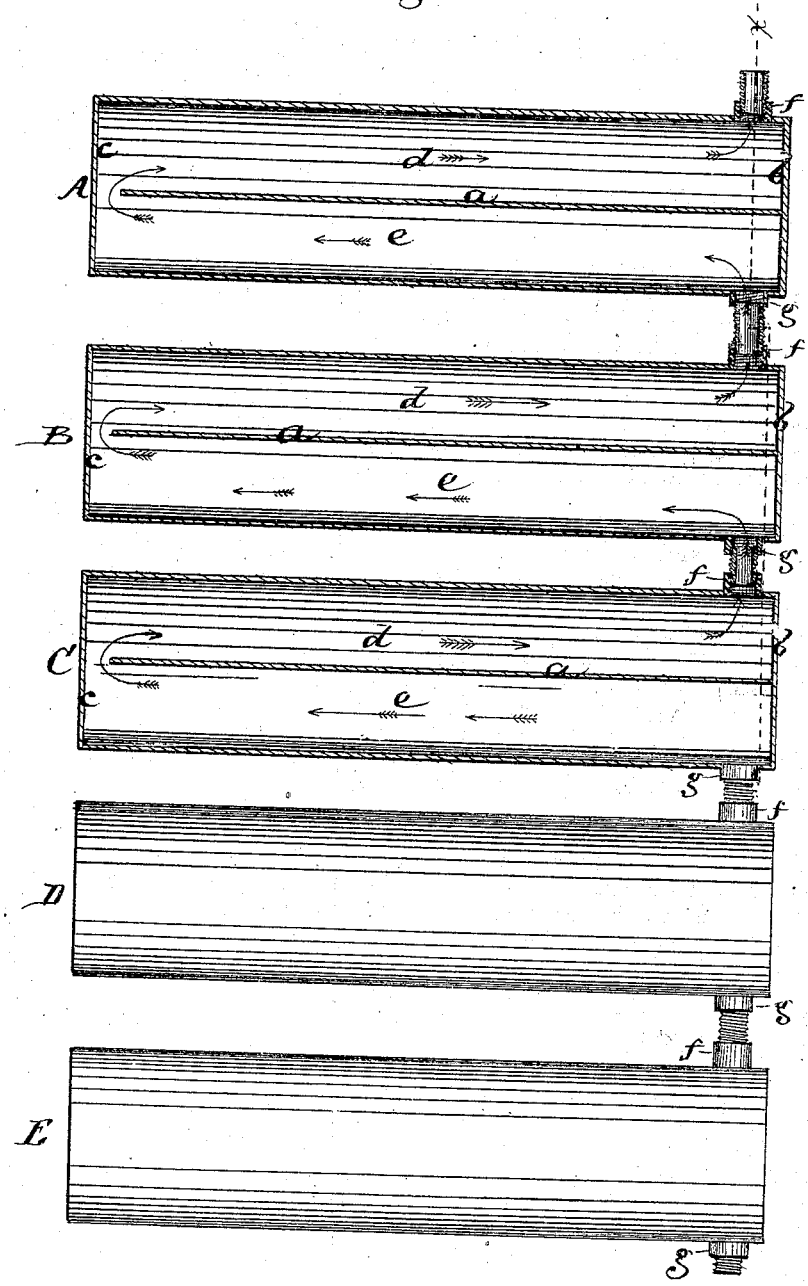

Figure 1 shows the pipes in side and sectional elevation. Fig. 2 is a cross-section on the line *x x*.

A, B, C, D, and E represent the several pipes composing the system. Each pipe is cast whole or without a joint, and with the central partition *a*, which extends from the end plate *b* nearly to the opposite end plate *c*, the partition dividing the pipe into two spaces or chambers *d e*, the tube being preferably about twice as wide as it is thick, so that, when divided by the partition, each chamber is nearly square or round in section. Each tube is cast with two nipples, *f g*, on opposite sides of the partition *a*, and in a suitable machine for simultaneously tapping screw-threads in the opposite nipples, the mandrels of the two screw-taps being in the same axial line. I form nut-threads in the outer ends of each pair of nipples, and then connect adjacent sections by the screw-threaded coupling tubes *h*. The steam or hot water passes through the chambers of the series in the direction denoted by the arrows; and the tubes are preferably arranged horizontally, surrounded by a suitable frame-work, and having suitable supports.

As the connections are in exact axial line, it will be obvious that no disposition to expand or contract can disturb the tightness of the joints or injuriously strain the pipes, while at the same time such connections are so simple as to enable the apparatus to be set up or taken down without other than the most ordinary skill of a stove or gas-fitter.

The pipes of the series may be arranged vertically; but I prefer the horizontal arrangement; and they may be arranged in a system composed of several series.

I claim—

In a radiating apparatus composed of pipes, each of which is divided by a central longitudinal partition, *a* extending nearly its whole length, the screw-threaded nipples *f g* of each pipe, made with their axes in the same line with each other and with that of their coupling-tube *h*, substantially as shown and described.

EDWARD C. CLAY.

Witnesses:
FRANCIS GOULD,
S. B. KIDDER.

(147)